United States Patent [19]

Jackson

[11] Patent Number: 4,953,165
[45] Date of Patent: Aug. 28, 1990

[54] DIAGNOSTIC SYSTEM FOR PERSONAL COMPUTER

[75] Inventor: George V. T. Jackson, Tempe, Ariz.

[73] Assignee: Southwestern Computer Technologies, Inc., Phoenix, Ariz.

[21] Appl. No.: 202,537

[22] Filed: Jun. 6, 1988

[51] Int. Cl.[5] .............................................. G06F 11/00
[52] U.S. Cl. .................................. 371/16.1; 371/25.1
[58] Field of Search ..................... 371/16, 20, 25, 15, 371/17, 15.1, 16.1, 25.1, 16.4, 16.5; 324/73 R, 73 A T; 364/200 MS File

[56] References Cited

U.S. PATENT DOCUMENTS

| | | | |
|---|---|---|---|
| 4,489,414 | 12/1984 | Titherley | 371/20 |
| 4,627,054 | 12/1986 | Cooper | 371/16 X |
| 4,703,446 | 10/1987 | Momose | 371/16 X |
| 4,718,064 | 1/1988 | Edwards | 371/16 X |
| 4,810,958 | 3/1989 | Mogi | 371/20 X |
| 4,823,343 | 4/1989 | Takahashi | 371/16 |

OTHER PUBLICATIONS

G. Kovach, "Protection Mode Aid for PC Diagnostics", IBM TDB, vol. 27, No. 8, 1/1985, pp. 4774-4780.
P. Beaven, "MP Card Test", IBM-TDB, vol. 20, No. 11A, 4/1978, pp. 4602-4605.
J. Dellheim, "Performance Measurement System", IBM TDB, vol. 26, No. 2, 7/1983, pp. 782-783.
"Testing the MP Periphery by an Adjustable Reference Voltage", IBM-TDB, vol. 31, No. 1, 6/1988, pp. 217-218.

Primary Examiner—Allen MacDonald
Assistant Examiner—Robert W. Beausoliel
Attorney, Agent, or Firm—Tod R. Nissle

[57] ABSTRACT

Apparatus for identifying hardware faults in data processing systems. The apparatus identifies hardware faults in the CRT, printer, modem, keyboard, buses and other peripheral units connected to a personal computer.

5 Claims, 2 Drawing Sheets

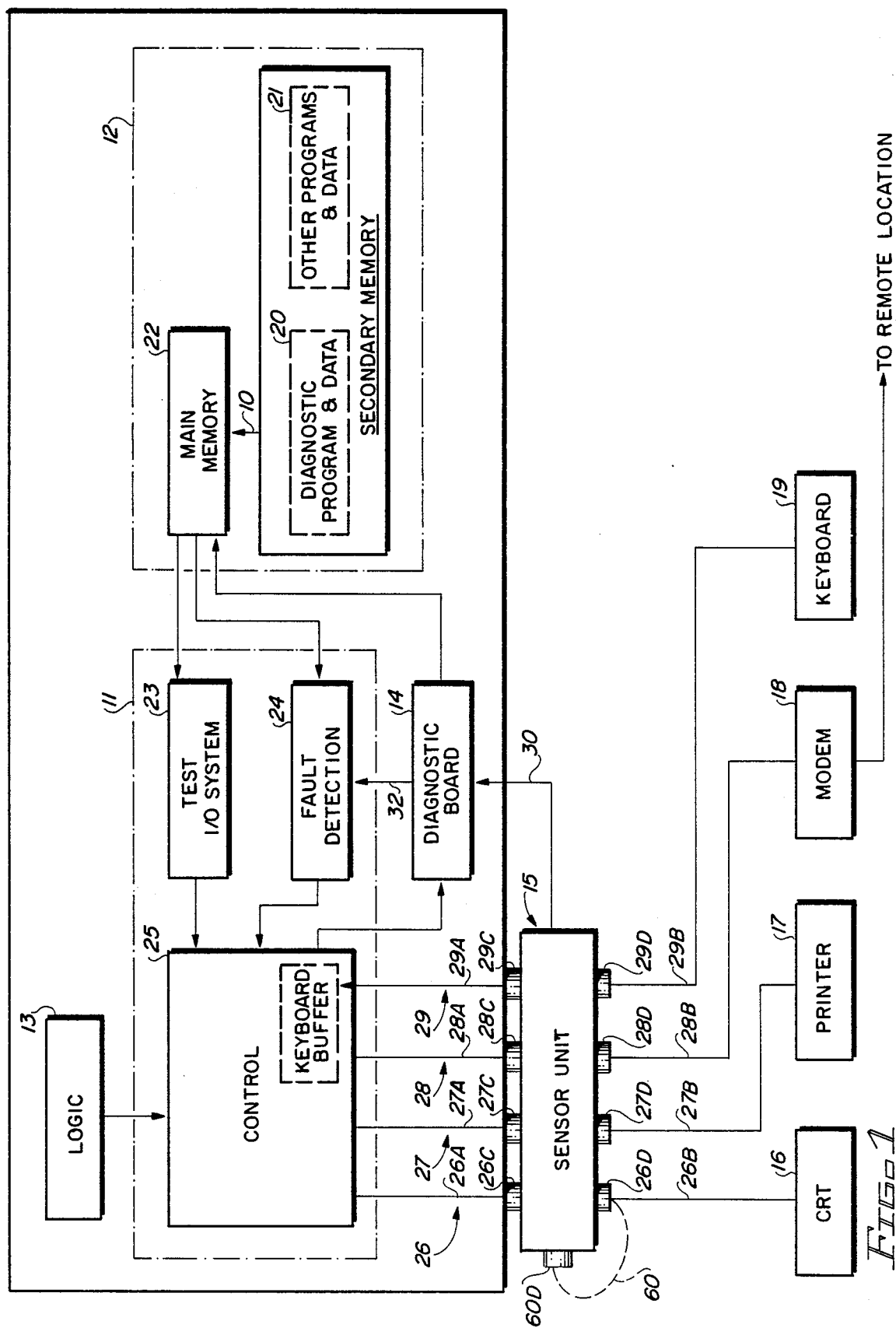

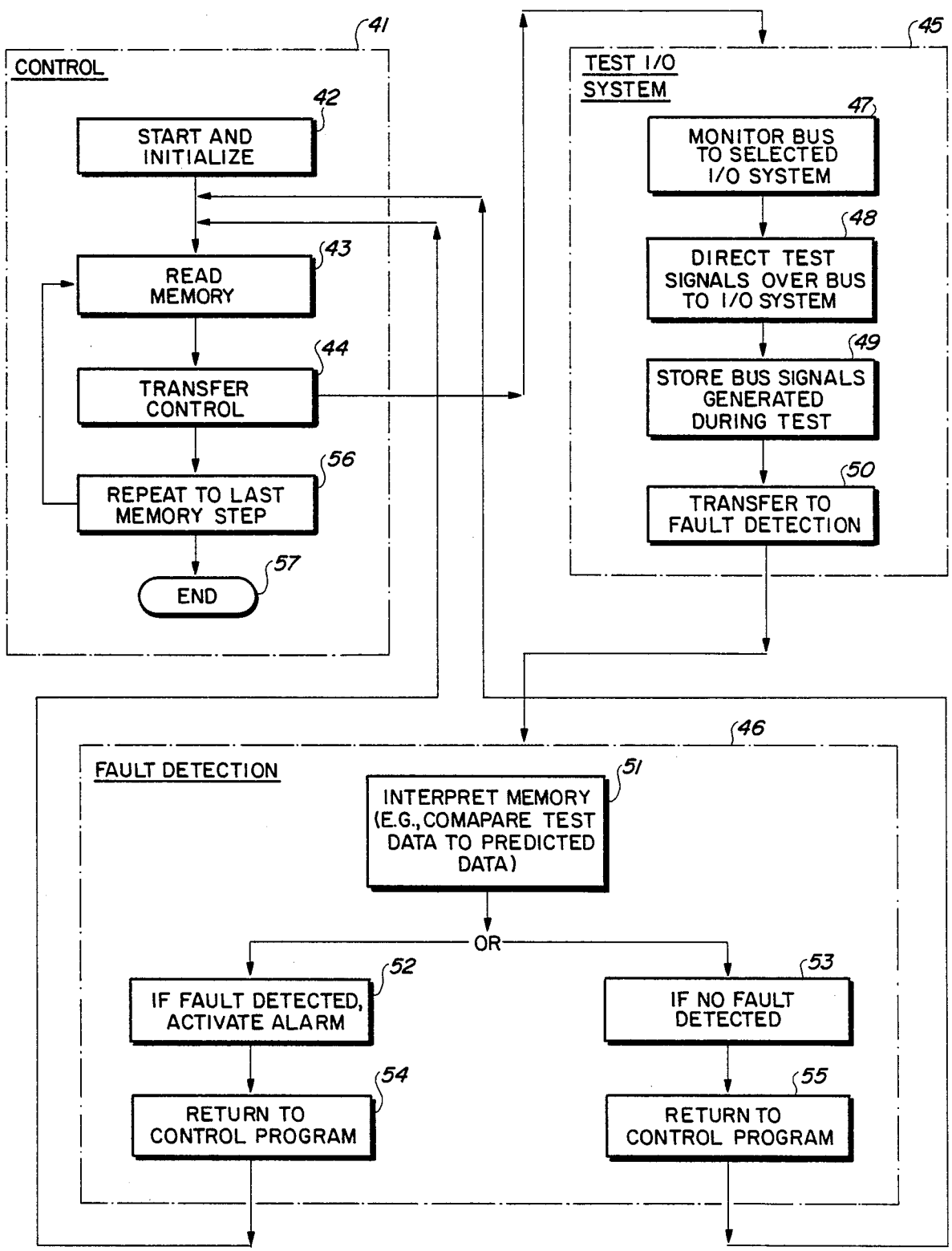

DIAGNOSTIC SYSTEM FOR PERSONAL COMPUTER

This invention relates to apparatus for identifying hardware faults in data processing systems.

More particularly, the invention pertains to apparatus for identifying, either on site or from a location remote to the location of a microprocessor, faults in the CRT, printer, modem, keyboard, buses and other peripheral unit connected to the microprocessor.

In another respect, the invention relates to apparatus for retrofitting a microprocessor such that hardware faults in the microprocessor and peripheral units of the computer can be readily identified by the operator of the computer.

A digital computer is functionally composed of five element: input, storage (sometimes called memory), control, logic (sometimes called arithmetic), and output. The control and logic elements are sometimes referred to collectively as the central processing unit or CPU. The functions of these elements are well known and are described in §2.02 of *Computer Law, Software Protection*, by David Bender, published by Matthew Bender & Company, Incorporated, 1986. §2.05[9] of *Computer Law, Software Protection*, supra, defines a micromcomputer, also known as a microprocessor, as comprising a "chip" containing all the elements necessary for the control and arithmetic portions of a computer. The birth of the microcomputer in about 1974 led to the proliferation of so-called "personal computers" or "PC's".

The microcomputer is distinguishable from the minicomputer. The minicomputer is essentially a small general purpose computer. Whereas the instructions and logic in a microcomputer are on a single chip, in a minicomputer and general purpose computers the instructions are on a plurality of chips. General purpose computers are also called main frame computers.

The distinction between microcomputers on one hand, and minicomputers and main frame computers on the other hand, is an important one with respect to the diagnosis of hardware faults. While diagnostic software programs exist for main frame and minicomputers, there apparently does not exist apparatus which permits hardware faults in a microcomputer to be readily determined on site or from a remote location, and which permits hardware faults in the CRT, printer, modem, keyboard, cables and other peripheral units connected to the microprocessor to be readily determined.

Accordingly, it would be highly desirable to provide an improved apparatus which would enable diagnosis of hardware faults in a microprocessor and in the peripheral systems connected to the microprocessor.

It would be highly desirable to provide improved microprocessor diagnostic test apparatus which could be readily utilized by the normal user of the microprocessor on site or which could be readily utilized by an individual at a location remote from the microprocessor.

Therefore, it is a principle object of the invention to provide improved apparatus for diagnosing hardware faults in a computer.

A further object of the instant invention is to provide improved computer diagnostic test apparatus of the type described which can be readily utilized by personnel who ordinarily operate the computer.

Another object of the instant invention is to provide improved diagnostic test apparatus which can identify hardware faults in the peripheral systems of a microprocessor, and which an be readily operated on site or operated from a location remote from the location of the microprocessor.

These and other, further and more specific objects and advantages of the invention will be apparent to those skilled in the art from the following detailed description thereof, taken in conjunctions with the drawings, in which:

FIG. 1 is a block diagram illustrating an improved microcomputer embodying the present invention; and, FIG. 2 is a block diagram which illustrates a typical program or logic function utilized in accordance with the presently preferred embodiment of the invention.

Briefly, in accordance with the invention, I provide an improved microcomputer system. The microcomputer system includes housing means; a main memory unit carried in said housing means for storing data and program instructions; a secondary memory unit carried in said housing means for storing data and program instructions to be selectively accessed into the main memory unit; a central processing unit; at least one peripheral unit; and, a bus leading from said peripheral unit to the central processing unit. The central processing unit includes a control unit for interpreting and executing instructions obtained from the main memory unit, and a logic unit for performing arithmetic and comparative operations. The improvement in the microcomputer system enables testing of the peripheral unit for faults. The improvement comprises, in combination with the microcomputer system, program means in the secondary memory unit for, when the program means is accessed into said main memory and executed, causing the control unit to direct a diagnostic test signal over the bus to the peripheral unit; means for identifying the diagnostic test signal in the bus line and for identifying any secondary signals in the bus generated in response to the diagnostic test signal; means for storing the diagnostic and secondary signal information; means for recalling the stored diagnostic and secondary signal information; and, means for comparing the recalled diagnostic and secondary signal information with priorly derived predicted test signal information for the diagnostic test signal and for generating fault evaluation signals. The peripheral unit can a CRT, modem, printer, keyboard, or a cable connecting the CRT, modem, printer, or keyboard to the microcomputer.

In another embodiment of my invention I provide a method for testing a microcomputer. The microcomputer includes housing means; a main memory unit carried in the housing means for storing data and program instructions; a secondary memory unit carried in the housing means for receiving and storing data and program instructions to be accessed to the main memory unit; a central processing unit; at least one peripheral unit; and, a bus for carrying signals between the control unit and the peripheral unit. The central processing unit includes a control unit for interpreting and executing instructions obtained from the main memory unit; and, a logic unit for performing arithmetic and comparative operations. The bus includes a first portion leading from the peripheral unit to a connector mounted in the housing; and, a second portion leading from the connector to the central processing unit. The method comprises the steps of disconnecting the second portion of the bus from the connector; attaching signal identification means to the connector to sense signals in the bus between the control unit and peripheral unit and including a secondary connector to receive the disconnected second portion of the bus and means for sensing signals in the bus; connecting diagnostic circuitry to the sensing means to receive and store signals identified by the sensing means; loading a diagnostic program in the secondary memory, the diagnostic program including a diagnostic test sub-routine to cause said control unit to generate a test signal over the bus between the peripheral unit and the control unit; accessing the diagnostic program from the secondary memory into the main memory; applying a diagnostic test sub-routine address to the main memory where the address represents the address of the diagnostic test sub-routine associated with the testing of the peripheral unit; executing the first diagnostic test sub-routine in response to the receipt of the address to generate a test signal in the bus between the peripheral unit and the control unit; storing in the diagnostic circuitry signals detected by said sensing mean in the bus during the first diagnostic test sub-routine; and, comparing the stored signals from the first diagnostic test sub-routine with priorly derived predicted test data for the peripheral unit.

Turning now to the drawings, which depict the presently preferred embodiments and best mode of the invention for the purpose of illustrating the practice thereof and not by way of limitation of the scope of the invention, and in which like reference characters represent corresponding element throughout the several views, FIG. 1 is a block diagram which illustrates a preferred embodiment of the improved personal computer or microcomputer of the invention, the main components of which are a controller 11, memory 12, logic 13, diagnostic board 14, sensor unit 15, peripheral output units CRT 16, printer 17 and modem 17, and peripheral input unit keyboard 19.

As indicated by dashed lines 20 a diagnostic program and data are loaded into secondary memory 21. Memory 21 ordinarily comprises a floppy disk or hard disk memory. The diagnostic program and data 20 can be accessed into the main memory 22 in conventional fashion such that controller 11 has access to program 20.

The controller 11 utilizes the data and instructions of diagnostic program 20 to perform the dual function of testing a selected I/O system 23 and of fault detection 24. During the I/O test 20, the control unit 25 causes at least one test signal to be directed over a bus or harness leading from the control unit 25 an I/O unit or system 16 to 19. The signal directed over buses 26 and 29 between control unit 25 and I/O units 16 to 19, respectively, can travel either from control unit 25 to I/O unit 16-19, or vice versa, depending on the I/O unit involved. For instance, control unit 15 sends signals to CRT 16, but the CRT normally does not send signals to control unit 25. Signals are both sent from control unit 25 to printer 17 and modem 18 and are sent from printer 17 and modem 18 to control unit 25. Keyboard 19 inputs signals over bus 29 to control unit 25, but control unit 25 ordinarily does not send signals to keyboard 19. The bus or cable 26B from CRT 16 is, prior to installation of sensor unit 15, normally attached to hardness connector 26C. Similarly, the bus 27B from printer 17, prior to installation of unit 15, is attached to connector 27C; bus 28B from modem 18 is attached to connector 28C; and, bus 29B is attached to connector 29C. Bus connectors 26C to 29C are often threaded or otherwise formed so buses 26B to 29B can be removably attached to the connectors. Sensor unit 15 is attached to connectors 26C to 29C after buses 26B and 29B have been disconnected from connectors 26C to 29C. Buses 26B to 29B are then reconnected to connectors 26D and 29D, respectively, as illustrated in FIG. 1. Accordingly, the structure of connector 27D is ordinarily identical or functionally equivalent to that of connector 26C, the structure of connector 27D is ordinarily identical that of 27C, the structure of connector 28D is ordinarily identical to that of 28C, and the structure of connector 29D is identical to that of connector 29C. Sensor unit 15 permits signals to readily flow through sensor unit 15 from buses 26B to 29B to buses 26A to 29A, respectively. Wires or other means in unit 15 are used to sense signals moving along buses 26 to 29 and to direct 30 such test signal information to the diagnostic board 14. Memory registers in board 14 retain the signals 30 until control unit 25 directs the test signal information stored in a diagnostic board 14 to be recalled or transferred 31 to main memory or to be recalled 32 to temporary memory registers in control unit 11 for use during fault detection 24.

During fault detection 24 the controller 11 compares the test signal information in main memory 22 or in temporary memory register in unit 11 to priorly derived predicted signal information. If the actual test signal information corresponds to the predicted signal information, there is no hardware fault. If the actual test information does not correspond to the predicted information then a hardware fault is indicated.

The memory 12 can be any suitable prior art memory unit used in microcomputers. For example, electromagnetic memories such as magnetic, optical, solid state, etc. or mechanical memories such as paper tape can be utilized. The diagnostic board 14 is presently fabricated as a printed circuit board and for installation in a standard I/O slot of a microcomputer like an IBM 5150/5160 or compatible PC/AT system. The controller 11 and logic 13 are, as earlier noted, fabricated on a single chip. Such microprocessor chips are widely utilized in personal computers or PC's. Apparatus for sensing electrical signals along buses 26 to 29 and then transmitting such information to diagnostic board 4 can comprises commonly utilized electrically conductive wiring, fiber optics, electromagnetic waves, etc. and other suitable prior art sensing and transmission apparatus.

FIG. 2 is a block flow diagram which illustrates a typical diagnostic program 20 or logic function which is executed by the controller 11 in testing for hardware faults in the I/O units 16 to 19. The basic control program 41 consists of commands to "start and initialize" 42, "read memory" 43, and "transfer control" 44 to the test I/O system sub-routine 45. The test I/O system sub-routine 45 consists of commands to "monitor bus to selected I/O system" 47 (e.g., to have the diagnostic board 14 monitor the appropriate bus 26 to 29), to "direct test signals of over bus to I/O system" 48 (e.g., to cause a signal(s) to move along the bus connecting the I/O unit 16 to 19 and the control unit 25), to "store bus signals generated during test" 49 (e.g., to h:ve board 14 store signals sensed in the appropriate bus during the test), and "transfer to fault detection" 50.

The fault detection sub-routine 46 consists of commands to "interpret memory" 51 (e.g., compare the signals stored in board 14 with priorly derived predicted test signal information), and commands 52 to 55. If a "fault is detected" 55, an alarm is activated. Activating the alarm can comprise illuminating a warning light, causing a fault indicator to appear on CRT 16, causing a fault indicator to print out on printer 17, or any other desired alarm procedure. After the alarm is activated, the "return to control program" 54 command follows. If "no fault" 53 is detected, command 55 causes a return to the control program. The control program 41 and the test I/O system 45 sub-routine and fault detection 45 sub-routine are repeated for each of other I/O units desired to be tested as indicated by the "repeat to last memory step" 56 of the control program 41 followed by an "end" program step 57 which completes execution of the program.

In operation, the diagnostic program 20 is loaded into secondary memory. Secondary memory typically consists of a floppy disk or hard disk. The diagnostic program 20 is then "booted" into main memory 22. The operator of the microcomputer of FIG. 1, accesses the main menu. The main menu provides a list of addresses for sub-routines which can be utilized to test various I/O units or systems for hardware faults. The operator selects one of the sub-routine addresses. For example, one of the test normally listed on the menu is "CRT TEST". Selecting this address causes the CRT test diagnostic sub-routine in program 20 in main memory 22 to be executed. While executing this sub-routine, control unit 25 causes a signal to be sent along bus 26 to CRT 16. Sensor unit 15 detects the signal sent along bus 26 and transmits this information into the memory registers of diagnostic board 14. Board 14 stores the test signal information per a command earlier received from control unit 25. This completes the test of the I/O system 23. Controller 11 then utilized the fault detection 24 sub-routine of program 20 to determine if there is a fault in control unit 25. Prior to execution of the fault detection 24 sub-routine the test signal information stored in the memory registers of board 14 is transferred to main memory 22 or to temporary memory registers in controller 11 by executing a designated command, for instance "READ". The data in the memory registers of board 14 can be completely erased by executing a designated command, for instance "RESET". Once a diagnostic sub-routine from memory 22 is executed and test signal data is stored in the memory registers of board 14, the diagnostic program 22 will not permit another diagnostic sub-routine to be executed until the information in the memory registers of board 14 is removed by executing a "READ" command (e.g., a command transferring the information to memory) or a "RESET" command (e.g., a command erasing the information).

The fault detection 24 sub-routine compares the test signal information recalled from diagnostic board 14 (or memory 22) with priorly derived predicted test data. If the test data corresponds to the priorly derived test data, then the control unit 25 is assumed to be operating properly. For example, if the control unit 25 was supposed to send thirty-one pixels of information to CRT 16, and did, unit 25 operated properly. If only thirty pixels of information were detected on bus 26 by sensor unit 15, then the control unit 15 may not be operating properly. A malfunctioning CRT 16 can "load down" bus 25 and cause sensor unit 15 to read an incorrect number of pixels even through unit 25 transmitted the correct number of pixels. If the incorrect number of pixels is detected in bus 26 by sensor unit 15, the CRT 16 is disconnected from unit 15, and a cable 60 is used to interconnect connectors 26D and 60D. The cable 60 simulates the resistance, etc. characteristics of bus 26B. The "CRT Test" sub-routine is then repeated. If the proper number of pixels is detected, control unit 25 operates properly. If an incorrect number of pixels is detected, the control unit 25 is not operating properly.

The diagnostic sub-routines for testing printer 17 and modem 18 operate in a fashion similar to that described for the test o the CRT 16. During tests of the printer 17 and modem 18, however, signals can be generated which travel from printer 17 and modem 18 to control 25. During diagnostic testing of keyboard 19, control 25 can cause a test signal to be generated in bus 29 by commanding the operator to press a key on keyboard 19 to cause a signal to travel from keyboard 19 to control unit 25.

Diagnostic board 14 can be connected to internal components of the microprocessor receive test signals therefrom. Board 14 can, for instance, be connected to a power supply, to another circuit board, etc. to monitor the operation of such components. Internal component test signals stored in the memory registers of board 14 can be compared to priorly derived predicated test signals to determine if the internal components are functioning properly.

The diagnostic system of the invention can be operated from a remote location through modem 18. Diagnostic program 20 permits an operator at a remote location to select in conventional fashion a particular diagnostic sub-routine and to otherwise operate program 20 in the same manner a local on-site operator would operate the program. If an operator at a remote location is operating program 20, an individual on-site with the equipment of FIG. 1 is still necessary in the event a test procedure requires that buses 26B to 29B be disconnected from sensor unit 15.

The following Tables I and II further define optional criteria for software and hardware utilized in an IBM 5150/5160 microcomputer in accordance with the principles of the invention. In Table I, the term "software" corresponds to diagnostic program 20. In Table II, the descriptions "I/O Diagnostic Test Fixture" and "PC I/O Diagnostic Test Fixture" and "Test Fixture" each correspond to diagnostic board 14. The term "software" in Table II corresponds to diagnostic program 20.

TABLE I: Test Criteria for Diagnostic Program 20

(A) SELF-BOOTABLE
  1.0 The software is self-loading from 360KB/1.2 Meg floppy disk drive.
  1.1 software performs "extensive, and indepth" system testing of the following, and gives appropriate error information, as well as generating operator instruction/options display on both CRT/Printer.

(B) TESTING OF SYSTEM UNIT
  1.0 The software performs the following Ram test on MEM unit:
    (a) Write the zero's
    (b) Read all zero's
    (c) Write all one's
    (d) Read all one's
    (e) Write checkerboard 0/1
    (f) Read checkerboard 0/1
    (g) Test system memory refresh capability
    (i) Write data pattern to have (e & f) of above in parity ram
    Complement data of steps (e&f) above and perform.
  1.1 Perform DMA diagnostic (total chip exercise)

1.2 Perform PIO diagnostic (total chip exercise)
1.3 Perform Timer Chip diagnostic (total chip exercise)

(C) THE SOFTWARE PROVIDES OPERATOR TEST MENU'S
1.0 Main Menu
  (a) SYSTEM UNIT TEST
  (b) CRT TEST
  (c) PARALLEL POST TEST
  (d) PARALLEL PORT CABLE TEST
  (e) PRINTER TEST
  (f) ASYNCHRONOUS PORT TEST
  (g) ASYNCHRONOUS PORT CABLE TEST
  (h) KEYBOARD TEST
  (i) MODEM/TELEPHONE LINE TEST
1.3 If the site modem is successful in transmitting and receiving data, then have it transmit the "tested signal quality" results" to network control.
1.4 If the communication effort was not successful, then the local operator is provided keyboard access with CRT and printer display of the signal quality results.

(M) LEARN MODE
1.0 Provide the "LEARN MODE" operator selection menu.
1.1 The "LEARN MODE" will exercise and capture data. This captured data will become the standard test measurement for all future testing, until "LEARN MODE" is re-entered or abandoned.
1.2 When the "LEARN MODE" is abandoned the original system specification for the test will become standard.

(N) REMOTE CONTROL TESTING
1.0 Provide the remote operator an option key-board selection menu, thus enabling him/her to exercise and test from a remote location (by way of phone-line.)
1.1 The test software will be bootable at the site from a floppy Diskette.
1.2 The system will began the local test if there is a F2 Key-stroke after the software is loaded.
1.3 The system will began the remote control test when it is activated through the communication port.
1.4 The CRT/printer will be presented at both network control & the site under evaluation (SUE).
1.5 The testing & control of SUE will be done entirely at network control.
1.1 The Select Menu provides the following options:
  (a) The number of times to perform the selected test 0–99.
  (b) For a carriage return input the number of times to perform the test will default to one (1) time.
  (c) All tests will be performed a minimum of ten (10) times even though the operator may enter one (1) or "carriage return". If a two (2) is entered by the operator, then the test will be performed 20 times. For an operator entry of 3 the test will run 30 times.
1.2 The (I) selection will bring up a special menu for the Modem and Telephone test.

(D) CRT TEST
1.0 Test Specification-All the tests listed below will be performed automatically and each test will be executed 10 times. If the option selected will be multiplied X10. All errors will be reported to the CRT and Printed for the operator. When reporting an error the speaker will sound six times. At the completion of the total test the speaker will sound one time.
  (a) Horz sync test
    (1) The positive component test
    (2) The negative component test
  (b) Vertical sync test
    (1) The positive component test
    (2) The negative component test
  (c) Data Test
1.1 Each of R G B electron guns in the CRT will be tested independently of each other. The intensity control will be tested in conjunction with each R G B gun; then, all of the guns and intensity control will be tested simultaneously.

(E) PARALLEL PORT TEST
1.0 All Data Bits D0–D7 will be tested for a 0 and 1 condition, ripple 0/1, all bits 0, and then all bits 1.
1.1 All printer control lines will be tested for 0 and 1 condition, ripple 0/1, all bits 0, and then all bits 1.

(F) PARALLEL PORT CABLE TEST
1.0 The CRT/Printer operator message instructs the operator to remove the cable from the printer (not printer must have a/c power off at this time) then reconnect the cable to the I/O test fixture.
1.1 Next, all the tests performed in the parallel port test will be executed on the cable.
1.2 Finally the CRT/Printer operator message instructs the operator to reconnect the cable to the printer and turn the a/c power on at the printer.

(G) PRINTER TEST
1.0 Print all printable characters 4 times.
1.1 Perform barber pole test (all printable characters).
1.2 Perform lines feed test.
1.3 Perform form feed test.
1.4 Perform out of paper test (note) have operator break paper, and after tests, have operator reinstall the paper.
1.5 Perform head carriage position test.
1.6 Test the printer in the customers configuration and operation mode.

(H) ASYNC PORT TEST
1.0 Perform diagnostic test on async port to assure the 8250 ACE is performing to specification.

(I) ASYNC PORT CABLE TEST
1.0 Instruct the operator to remove the async cable from the mode (Note a/c power should be removed from the modem at this time).
1.1 Instruct the operator to reconnect the cable to the I/O tester then perform the test insuring all signals are tested for 0 and 1 condition independently of each other.
1.2 Instruct the operator to recable the async-cable to the modem and turn the power back on at the modem.

(J) KEYBOARD TEST
1.0 Instruct the operator to depress the appropriate key. Next, insure that all keys and key combinations are tested.

(K) MODEM STAND ALONE TEST
1.0 Test modem for product type.
1.1 Test modem for dial tone.
1.2 Test and have operator verify all LED's turn on/off.
1.3 Test modem for correct customer switch-settings.
1.4 Test all 16 S REG. for all bit options and control.
1.5 Test all the 8250 ACE error detection ability.
1.6 Test modem ability to adjust to incoming data format.

1.7 Perform analog loop back on modem and verify all ASIC data characters.

(L) MODEM ON LINE TEST 1.0 Test modem ability to insure proper ring control.

1.1 Test modem digital loopback to verify data and measure signal quality level. Next, retain the high and the low values and then compute the Average.

*1.2 Test modem data communication back to network control. Verify that the data sent from the modem accurately passes through the Network Control Computer and back to the modem correctly, measure signal quality on receive side, keep the high and the low values and then Average.

TABLE II: Engineering Specification for Board 14 and Program 20

1.0 TITLE

Engineering Specification for PC I/O diagnostic Test Fixture 2.0 OBJECTIVE

To develop a system which will give computer personnel the ability to remotely troubleshoot and repair IBM 5150/5160 and compatible PC systems to the unit level 3.0 GOALS Whenever a malfunction has been detected at a system site this internal I/O diagnostic Test Fixture with gevi Network Control personnel the ability to be 99% accurate in their diagnoses of an IBM 5150/5160 and compatible PC systems, enabling them to take corrective action with minimum down time.

4.0 HARDWARE/SOFTWARE 4.1 Hardware 4.1.1 The internal I/O Diagnostic Test Fixture is a custom designed printed circuit board to be installed in the IBM 5150/5160 and compatible PC system unit. A special cable harness will interface with the following units:
Keyboard
Video CRT
Modem/RS232
Printer 4.1.2 The I/O Diagnostic Test Fixture will be activated with specially designed software which will enable the I/O Test Fixture to monitor all interface commands, data, and control signals sent or received from each I/O device.

4.2 Software 4.2.1 Software will be loaded into system RAM memory from the floppy disk drive. Operator information will be presented on the CRT and printer simultaneously.

4.2.2 Testing will be menu driven, and displayed on both the CRT and printer allowing Network Control personnel to effectively monitor and the testing, making the proper determination from each of the test results.

5.0 APPLICABLE FORMS AND DOCUMENTS 5.1 Logic flow charts and schematics marked P87F101

5.2 To-from wiring list marked P87F101

5.3 Component inventory list marked P87F101

5.4 Schematic component list marked P87F101

5.5 Wiring diagram for interface harness marked P87F101

5.6 Orthographic drawing of interface harness marked P87F101

5.7 (TBA) Software operation procedures 5.8 (TBA) Software listing of code object modual and source code 5.9 (TBA) Network controls operation procedure 5.10 (TBA) Printed circute board artwork 6.0 GENERAL REQUIREMENTS 6.1 Conform to all accepted standard engineering conventions.

6.2 The interface procedure and command string sequence from the software to the I/O Test Fixture must be adhered to in order to insure valid test results.

6.3 The command string sequence is as follows:
6.3.1 Write I/O Test
6.3.2 Read I/O Test
6.3.3 Reset I/O Test 7.0 DEFINITIONS - N/A 8.0 HARDWARE REQUIREMENTS 8.1 Hardware to be designed with purpose and economy in mind without sacrifice of the reliability and performance.

8.2 Design requirements are to meet customer needs and applications.

8.3 Test Fixture is to be fabricated as a printed circuit board and to be installed in a standard I/O slot of IBM 5150/5160 or compatible PC/AT system.

8.4 All internal components are to be chosen from a list of manufacutres with history of high reliability.

8.5 Manufacture is to be chosen by considering the following factors:
8.5.1 Quality Control
8.5.2 Reliability
8.5.3 Ability to meet schedules
8.5.4 Ability to provide engineering assistance if required
8.5.5 Cost 9.0 SOFTWARE REQUIREMENTS 9.1 Software to be designed with purpose and economy in mind without sacrifice of reliability and performance.

9.2 Design requirements are to meet customer needs and applications.

9.3 Manufacture is to be chosen by considering the following factors:
9.3.1 Quality Control
9.3.2 Reliability
9.3.3 Ability to meet schedules
9.3.4 Ability to provide engineering assistance if required.
9.3.5 Cost 10.0 SOFTWARE COMMANDS 10.1 ADDR 0201H 10.1.1 This address with a write command and data=01H will instruct the test fixture to monitor all the printer data bits D0 thru D7 inclusive.

10.1.2 The standard parallel interface cable to the printer must be disconnected and looped back to the tester interface.

10.2 ADDR 0201H 10.2.1 This address with a write command and data=04H will instruct the test fixture to monitor all the printer command and status signals.

10.2.2 The standard parallel interface cable to the printer must be disconnected and looped back to the tester interface.

10.3 ADDR 0201H 10.3.1 This address with a write command and data=02H will instruct the test fixture to monitor the modem data read/write for add OR even data bits.

10.3.2 This address will also test for power supply error, verify that the power on reset was active to the keyboard cable connector. Test printer cable and RS232 cable grounds.

10.3.3 The standard EIA interface cable to the modem must be disconnected and looped back to the tester interface.

10.4 ADDR 0201H 10.4.1 This address with a write command and data=08H will instruct the test fixture to monitor all the commands and control signals to and from the modem. This address will also test keyboard ground and keyboard power.

10.4.2 The standard EIA interface cable to the modem must be disconnected and looped back to the tester interface.

10.5 ADDR 0201H 10.5.1 This address with a write command and data=10H will instruct the test fixture to measure the pulse width of the positive component of the vertical sync pulse to the monitor.

10.6 ADDR 0201H 10.6.1 This address with a write command and data=20H will instruct the test fixture to measure the pulse width of the positive component of the horizontal sync pulse going to the monitor.

10.7 ADDR 0201H 10.7.1 This address with a write command and data=40H will instruct the test fixture to measure the total width of the vertical sync pulse going to the monitor.

10.8 ADDR 0201H 10.8.1 This address with a write command and data=80H will instruct the test fixture to measure the total width of the horizontal sync pulse going to the monitor.

10.9 Addr 0203H 10.9.1 This address and a write command and data=01H will instruct the test fixture to capture the next key stroke data word from the keyboard and hold this data until it is read by the software.

10.10 ADDR 0203H 10.10.1 This address with a write command and data=02H will instruct the test fixture to reset the power failure indicator.

10.10.2 This address with a write command and data=04H will instruct the test fixture to monitor the video data being sent to each color gun of the CRT as well as the intensity control data.

10.10.3 It is a must condition that the CRT be blank (no video presentation on the screen), prior to issuing this instruction.

10.10.4 The test fixture will monitor the data stream sent to each color gun and the intensity control for ODD/EVEN data bits.

10.10.5 A loss of data on all color gun and intensity control lines for a duration of 20 micro seconds or more will cause the test fixture to store the ODD/EVEN count and terminate the command.

10.10.6 If the data stream does not terminate under software control the first vertical retrace pulse delivered to the CRT will terminate the instruction and the ODD/EVEN count results will be stored by the tester.

10.10.7 ADDR 0203H 10.10.8 This address with a write command and data=08H will cause the keyboard data to transfer from the keyboard shift register to fixture read register.

10.10.9 ADDR 0203H 10.10.10 This address with a write command and data=10H will cause the printer test data or the RS232 test data to be transferred to the fixture read register.

10.11 ADDR 0205H 10.11.1 This address with a read instruction will empty the test data register to the CPU data buss. The data is still present in the test fixture data register after this command is executed.

Having described my invention in such terms as to enable those skilled in the art to understand and practice it, and having identified the presently preferred embodiments thereof, I claim:

1. In a microcomputer system including
    housing means
    a main memory unit carried in said microcomputer housing means for storing data and program instructions,
    a secondary memory unit carried in said microcomputer housing means for storing data and program instructions to be selectively accessed into said main memory unit,
    a central processing unit including
        a control unit for interpreting and executing instructions obtained from said main memory unit, and,
        a logic unit for performing arithmetic and comparative operations,
    a least one peripheral unit exterior of said housing means, and
    a bus leading from said peripheral unit to said central processing unit,
the improvements in said microcomputer system which enable testing of said peripheral unit for faults therein, said improvements comprising, in combination with said microcomputer system,
    (a) program means in said secondary memory unit for, when said program means is accessed into said main memory and executed, causing said control unit to direct a diagnostic test signal over said bus to said peripheral unit;
    (b) sensor means carried by said microcomputer housing means intermediate said peripheral unit and said control unit for identifying said diagnostic test signal in said bus line between said peripheral unit and said control unit and for identifying any peripheral unit test signals directed from said peripheral unit through said bus in response to said diagnostic test signal;
    (c) means for storing said diagnostic and peripheral unit test signal information; and,
    (d) means for recalling said stored diagnostic and peripheral unit signal information; and,
    (e) means for comparing said recalled diagnostic and peripheral, unit signal information with priorly derived predicted test signal information for said diagnostic signal and for generating fault evaluation signals.

2. The microcomputer system of claim 1 wherein said peripheral unit is a modem.

3. A method for testing a microcomputer, said microcomputer including
    housing means, a main memory unit carried in said microcomputer housing means for storing data and program instructions, a secondary memory unit carried in said microcomputer housing means for receiving and storing data and program instructions to be transmitted to said main memory unit, a central processing unit including
- a control unit for interpreting and executing instructions obtained from said main memory unit, and,
- a logic unit for performing arithmetic and comparative operations, a least one peripheral unit exterior of said housing means, and a bus for carrying signal between said control unit and said peripheral unit and including
- a first portion leading from said peripheral unit to a connector mounted in said housing, and
- a second portion leading from said connector to said central processing unit, said method comprising the steps of:
(a) disconnecting said second portion of said bus from said connector;
(b) attaching signal identification sensor means to said connector to sense signals in said bus between said control unit and peripheral unit and including
  (i) a secondary connector to receive said disconnected second portion of said bus,
  (ii) means for sensing signals in said bus,
(c) connecting diagnostic circuitry to said sensing means to receive and store signals identified by said sensing means;
(d) loading a diagnostic program in said secondary memory, said program including a diagnostic test sub-routine to generate at least one test signal over said bus between said peripheral unit and said control unit;
(e) accessing said diagnostic program from said secondary memory into said main memory;
(f) applying a diagnostic test sub-routine address to said main memory where said address represents the address of said diagnostic test sub-routine associated with the testing of said peripheral unit;
(g) executing said diagnostic test sub-routine in response to the receipt of said address to generate a test signal in said bus between said peripheral unit and said control unit;
(h) storing in said diagnostic circuitry signals detected by said sensing means in said bus during said diagnostic test sub-routine; and,
(i) comparing said stored signals from said diagnostic test sub-routine with priorly derived predicted test data for said diagnostic test sub-routine.

4. The microcomputer testing method of claim 3, wherein said peripheral unit is a modem.

5. The microcomputer testing method of claim 3, wherein said diagnostic circuitry is carried on a semiconductor circuit board which is inserted in said housing means.

* * * * *